United States Patent [19]
Lynch

[11] Patent Number: 5,909,370
[45] Date of Patent: Jun. 1, 1999

[54] METHOD OF PREDICTING OVERSHOOT IN A CONTROL SYSTEM RESPONSE

[75] Inventor: Frank Lynch, Hatboro, Pa.

[73] Assignee: Honeywell Inc., Minneapolis, Minn.

[21] Appl. No.: 08/996,080

[22] Filed: Dec. 22, 1997

[51] Int. Cl.[6] ............................ G05B 15/00; G05B 11/42
[52] U.S. Cl. ............................ 364/148.05; 364/148.01; 364/148.09; 395/3; 706/14; 706/900; 706/903
[58] Field of Search .................. 364/148.05, 148.01, 364/148.09, 557; 395/3; 706/14, 900, 903

[56] References Cited

U.S. PATENT DOCUMENTS

| | | | |
|---|---|---|---|
| 4,268,784 | 5/1981 | Ganaway | 364/118 |
| 4,858,155 | 8/1989 | Okawa et al. | 364/557 |
| 5,149,472 | 9/1992 | Suganuma | 364/476 |
| 5,173,224 | 12/1992 | Nakamura et al. | 364/476 |
| 5,415,346 | 5/1995 | Bishop | 236/78 |

*Primary Examiner*—Reba I. Elmore
*Assistant Examiner*—Navin Natnithithadha
*Attorney, Agent, or Firm*—Robert J. Black; Anthony Miologos

[57] ABSTRACT

A process control system including a method of suppressing overshoot of a process variable beyond the process value setpoint by predicting the overshoot by observing a waveform associated with the process variable, observing the waveform associated with the process variable, without regard to time scale or to amplitude scale, taking corrective action to reduce or eliminate said overshoot by utilizing a fuzzy logic module with a proportional integral derivative control to take corrective action of the process variable.

8 Claims, 6 Drawing Sheets

| Dev CURVATURE | GREATER THAN 5X SUPPR | BETWEEN 1&5X SUPPR | LESS THAN SUPPR | ZERO OR NEGATIVE |
|---|---|---|---|---|
| INCREASING | INCREASE RULE 1 | NO CHANGE RULE 4 | SLOW DECREASE RULE 6 | DECREASE RULE 9 |
| FAST DECAY | NO CHANGE RULE 2 | NO CHANGE | SLOW DECREASE | DECREASE |
| EXP DECAY | NO CHANGE | DECREASE RULE 5 | DECREASE RULE 7 | FAST DECREASE RULE 10 |
| SLOW DECAY | DECREASE RULE 3 | DECREASE | FAST DECREASE RULE 8 | FAST DECREASE |

RELATIVE DEV

*TABLE A*

TABLE B

| CURRENT STATE | EVENTS | ACTIONS | NEXT STATE |
|---|---|---|---|
| ANY | \|Dev\| < DEV_THRESHOLD | Elatch=Dev_THRESHOLD<br>Dev CURVATURE=SLOW<br>RESET TIMER | RESET<br>0 |
| ANY | \|Dev\| > \|Elatch\| + HYSTERESIS | Elatch=Dev<br>Dev CURVATURE=INCR<br>RESET TIMER | INCREASING<br>1 |
| INCREASING | \|Dev\| > \|Elatch\| | Elatch=Dev<br>Dev CURVATURE=INCR<br>RESET TIMER | INCREASING<br>1 |
| INCREASING | \|Dev\| < DECAY THRESHOLD* \|Elatch\| | Elatch=Dev<br>Dev CURVATURE=INCR<br>last_count=timer<br>RESET TIMER | TURNAROUND<br>2 |
| INCREASING | timer>= MAX_COUNT (TIMEOUT) | Elatch=Dev<br>Dev CURVATURE=SLOW<br>last_count=timer<br>RESET TIMER | DECREASING<br>3 |
| TURNAROUND | \|Dev\| <DECAY THRESHOLD<br>*\|Elatch\| | Elatch=Dev<br>Dev CURVATURE= timer/last_count<br>IF(timer<Tmax)<br>   t_SCALE=timer<br>ELSE t_SCALE=Tmax<br>last_count=timer<br>RESET TIMER | DECREASING<br>3 |
| TURNAROUND | timer>=2* last_count OR timer>= 2*last_count timer>= MAX_COUNT (TIMEOUT) | Elatch=Dev<br>Dev CURVATURE=SLOW<br>IF(timer<Tmax)<br>   t_SCALE=TIMER<br>ELSE t_SCALE=Tmax<br>last_count=timer<br>RESET TIMER | DECREASING<br>3 |
| DECREASING | \|Dev\| <DECAY THRESHOLD *\|Elatch\| | Elatch=Dev<br>IF(Dev CURVATURE <timer/last_count)<br>   Dev CURVATURE= timer/last_count<br>last_count=timer<br>RESET TIMER | DECREASING<br>3 |
| DECREASING | timer>=2*last_count OR timer>= MAX_COUNT (TIMEOUT) | Elatch=Dev<br>Dev CURVATURE=SLOW<br>last_count=timer<br>RESET TIMER | DECREASING<br>3 |

METHOD OF PREDICTING OVERSHOOT IN A CONTROL SYSTEM RESPONSE

BACKGROUND OF THE INVENTION

1. Field of the Invention

The present invention relates to industrial process control systems, and, more particularly, to a method of suppressing overshoot, i.e., passing through or exceeding a controller setpoint.

2. Background Art

The so-called usage of fuzzy logic has been described in the periodical "Plastic Technology"—June 1996 issue, wherein it is noted that "fuzzy logic tends to make controls think like you do".

Fuzzy logic has been utilized extensively in the area of industrial process control. It has been utilized in place of conventional controls because it is able to overcome some of the problems inherent in typical solutions. It is particularly concerned with the overshooting or undershooting of setpoints or process limits by improving response time. Process control installations have found extensive utilization of fuzzy logic inasmuch as it becomes useful in the areas of temperature or pressure control by dealing with events or characteristics that disturb the normal stability of the usual industrial control structure. When a change occurs during process, because of some extraneous source, it is necessary to take some form of corrective action.

It has been determined that if operational limits are set too loosely in order to control overshoot or undershoot characteristics, a system typically will he slow to react. On the other hand, if tighter standards are included, the system may respond more quickly and subsequently cause more considerable overshoot. Thus, fuzzy logic addresses these concerns by adapting to so-called "human language", such as "too hot", "too cold", "too slow", or "too fast". Simply speaking, fuzzy logic defines process limits with typical linguistic terms other than strict mathematical terms. Effectively processed values are compared to one another and with various degrees of importance assigned to each value with decisions made upon such comparisons. If speed, for example, is excessive, then it would be desirable, for example, to set the speed to "slow".

Single loop controller systems with an included overshoot suppression feature have been disclosed by several manufacturers. One of these is disclosed in a paper entitled "A Proportional Integral Derivative (PID) Controller with Overshoot Suppression Algorithm" by Yasuda, Mano, Mori, Azegami and Crotty from the Proceedings of the ISA90 International Conference and Exhibition—pp 1849–1857. This paper teaches a method to suppress process overshoot using a fuzzy logic control technique.

Overshoot suppression is embedded in a proportional integral derivative controller as a set of knowledge-based fuzzy rules which function to modify the controller internal setpoint so the controlled variable stays on a would-be or proposed response curve without oversshoot in the presence of process changes. This design requires prior setting of a parameter, "the effective process dead time", which is set by the controller's auto tuner. This design works for systems having a relative slow dynamic response. It is reported that if the loop has a very fast overshoot, suppression does not work and could even make the loop unstable.

A fuzzy temperature controller by Omron is disclosed as a fuzzy temperature controller in their Model E5AF. This one-quarter DIN controller combines fuzzy and proportional integral derivative control for fast response to process disturbances. In the disclosed system, advanced PID control with feed-forward circuitry provides optimal response during start-up and steady-state operation. The included fuzzy and PID control work together to correct a process upset quickly with minimal overshot. The arrangement allows fuzzy parameters to be changed to adjust the fuzzy control's impact on the process. Accuracy to ±0.3% of set value is claimed. Omron's design indicates that the system requires prior setting of three parameters: fuzzy intensity, fuzzy scale 1 and fuzzy scale 2 by the user. Should these be incorrectly set, or when the system dynamic response is too slow, the system may become unstable.

Accordingly, it is the object of the present invention to describe a method of predicting overshoot in an industrial process control system to enable the control system to take the necessary corrective act ion to reduce or eliminate such overshoot.

SUMMARY OF THE INVENTION

In many typical industrial process control systems, it is considered highly undesirable for the process variable to overshoot or pass through and exceed the controller's setpoint when responding to a change in the setpoint or recovering from a disturbance within the system. The present invention describes a method of predicting such an overshoot, thereby enabling the control system to take corrective action to reduce or eliminate it. The prediction is achieved by observing the waveform of the process variable.

This method of observation of the process variable works with systems having a wide range of dynamic properties wherein no configuration parameter is to be set and no need for any prior learning of the system dynamics is required. The present method of overshoot suppression disclosed herein requires no parameters to be established and is stable over a very wide range of system dynamic properties. This is found to be true because the method is based on observing only the shape of the process variable waveform without regard to time or amplitude scales.

In a system that has no suppression for the setpoint value, overshoot will cause a substantial increase or rise over the setpoint before settling back to the setpoint after a period of time after stabilization occurs.

When overshoot suppression is applied to such a system, the setpoint is initially suppressed. During the rise of the process value (PV) toward the suppressed setpoint, a prediction is made that there will be an overshoot. Thus the setpoint is then held at the suppressed level until the process variable begins to level off. At this time suppression is reduced to bring the process variable to a "soft landing" without overshoot at the full setpoint level.

In a system where no overshoot exists, suppression is not used obviously and no change will occur. However, with overshoot suppression, the setpoint may be initially suppressed. However, as soon as the prediction is made on the basis of the shape of the waveform that there will be no overshoot, suppression is reduced, bringing the process variable to the full setpoint level with typically no loss in settling time.

The operation of overshoot suppression as described herein requires the ability to predict, during the rise of the process variable waveform, that it will overshoot. The method disclosed herein for performing that prediction does so over a wide range of process dynamic conditions without requiring prior knowledge of the process dynamics. This method makes use of the observation that when there is no overshoot the process variable approaches the setpoint approximately exponentially, and when there is to be an overshoot, more linearly. The observation was made by studying empirical test data from a wide range of system responses. Thus, there would be no overshoot, if as deviation decreases toward zero, it decays exponentially with time. On the other hand, should there be an overshoot, the deviation waveform is closer to linear.

The shape of the deviation curve, whether it is exponential, linear, etc., is assessed by measuring time intervals over which the deviation decays by a fixed proportion. The ratio of each pair of successive time values is used as a measure of the curvature or exponentiality of the waveform. Deviation curvature is utilized to predict whether there will or will not be an overshoot. Deviation curvature at or near a 0.8 figure indicates there would be an overshoot. A value at or near 1.0 indicates no overshoot. The deviation curvature signal is independent of the amplitude and the time scale of the deviation.

BRIEF DESCRIPTION OF THE DRAWINGS

The present invention will be described in detail with reference to the accompanying drawings wherein.

DETAILED DESCRIPTION OF THE PREFERRED EMBODIMENT

Figure 1:
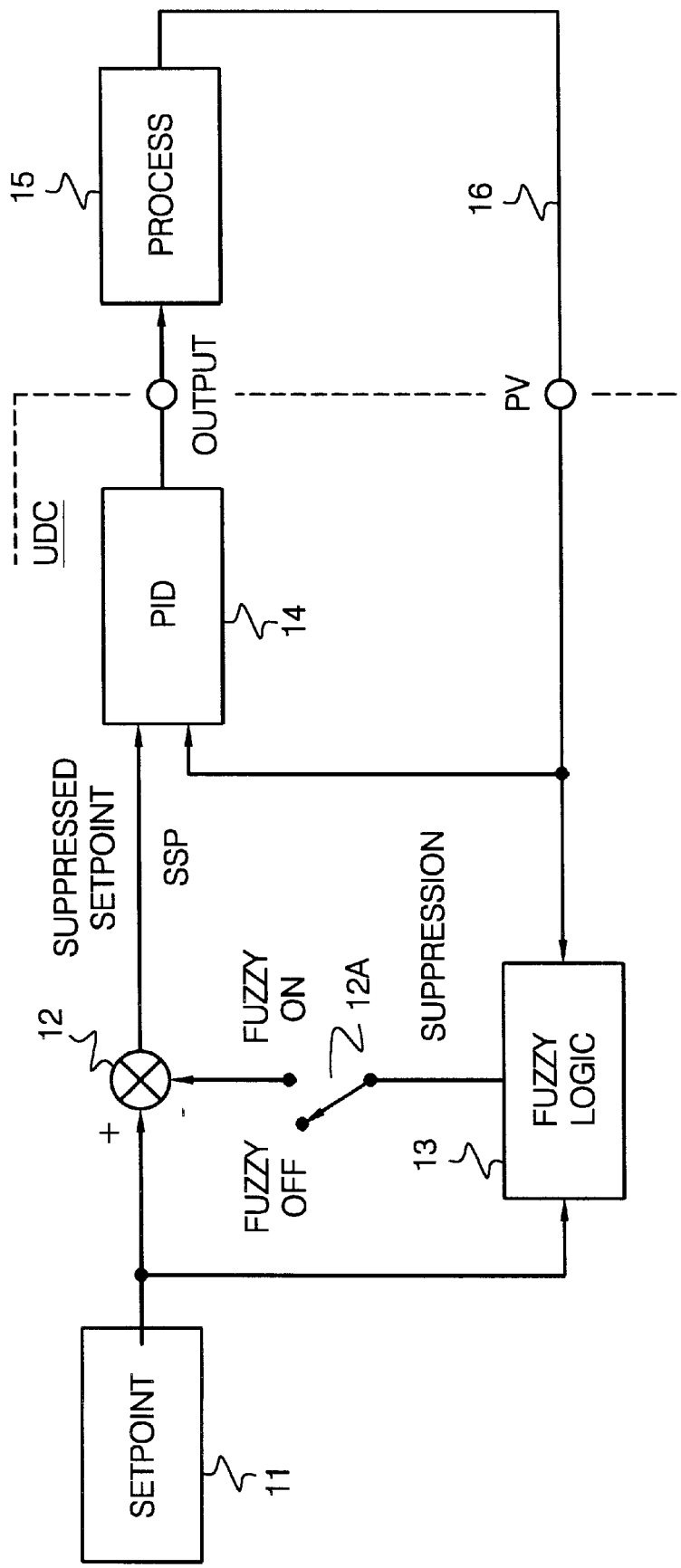
FIG. 1 is a block diagram of a control system including fuzzy logic as utilized in accordance with the method of the present invention.

Referring now to FIG. 1 of the drawings, the process control system utilizing fuzzy logic in accordance with the method taught by the present invention is shown. As can be seen, the fuzzy logic can be included or disconnected at switch 12A as required. The system shown is that of a UDC, or Universal Distributed Control type. Included are facilities 11 for establishing a setpoint for use in establishing a setpoint for the process 15 to be controlled. Connected between the setpoint and the process and a direct route is the connection between the setpoint and a proportional integral derivative unit whose output is connected to the process to be controlled. Midway between the setpoint establishment equipment 12 and the PID equipment 14 is a switch point 12 where through a switch 12A the fuzzy logic module 13 can be inserted into the circuitry providing a connection via the fuzzy logic from the setpoint equipment 11 to the PID equipment 14. A feedback of processed value via lead 16 is connected to both the fuzzy logic 13 and to the PID equipment 14. The fuzzy logic module 13 is expected to reduce overshoot over a range of values with no parameters to be established and no pretuning or learning required. The only configuration required is selection of "on" or "off" for the fuzzy overshoot suppression. Any stable loop which has overshoot will have its overshoot reduced or eliminated by use of the present method. Any loop with no overshoot will continue to have no overshoot and in no case will overshoot be significantly increased. On most loops with or without overshoot the median settling time change is expected to be negative.

To meet the above objectives, it is necessary to detect whether or not there will be an overshoot early enough to take the necessary action to prevent such overshoot and to do this without prior knowledge of the process dynamics. To achieve this, the design makes use of the observation that when there is no overshoot the process value approaches the setpoint approximately exponentially, and when there is an overshoot, more linearly. This observation is made by studying numerous amounts of empirical test data from a wide range of system responses including those of processes with multiple lags and deadtime.

It has been determined that there will be no overshoot (that is the amount of the setpoint minus the process value) if the deviation decreases toward zero and decays exponentially with time. When there is an overshoot, the deviation waveform is closer to linear. At the other extreme, should the response be sluggish, the response is far greater than that of the exponential curve. Solution of the problem is in part determined by measurement of the curvature of such curve. The shape of the deviation of the curve as to whether it is exponential, linear, etc., is assessed by measuring time intervals over which the deviation decays by a fixed proportion. That is, the ratio of each pair of successive time values is used as a measure of the curvature or exponentiality of the waveform.

Figure 2:
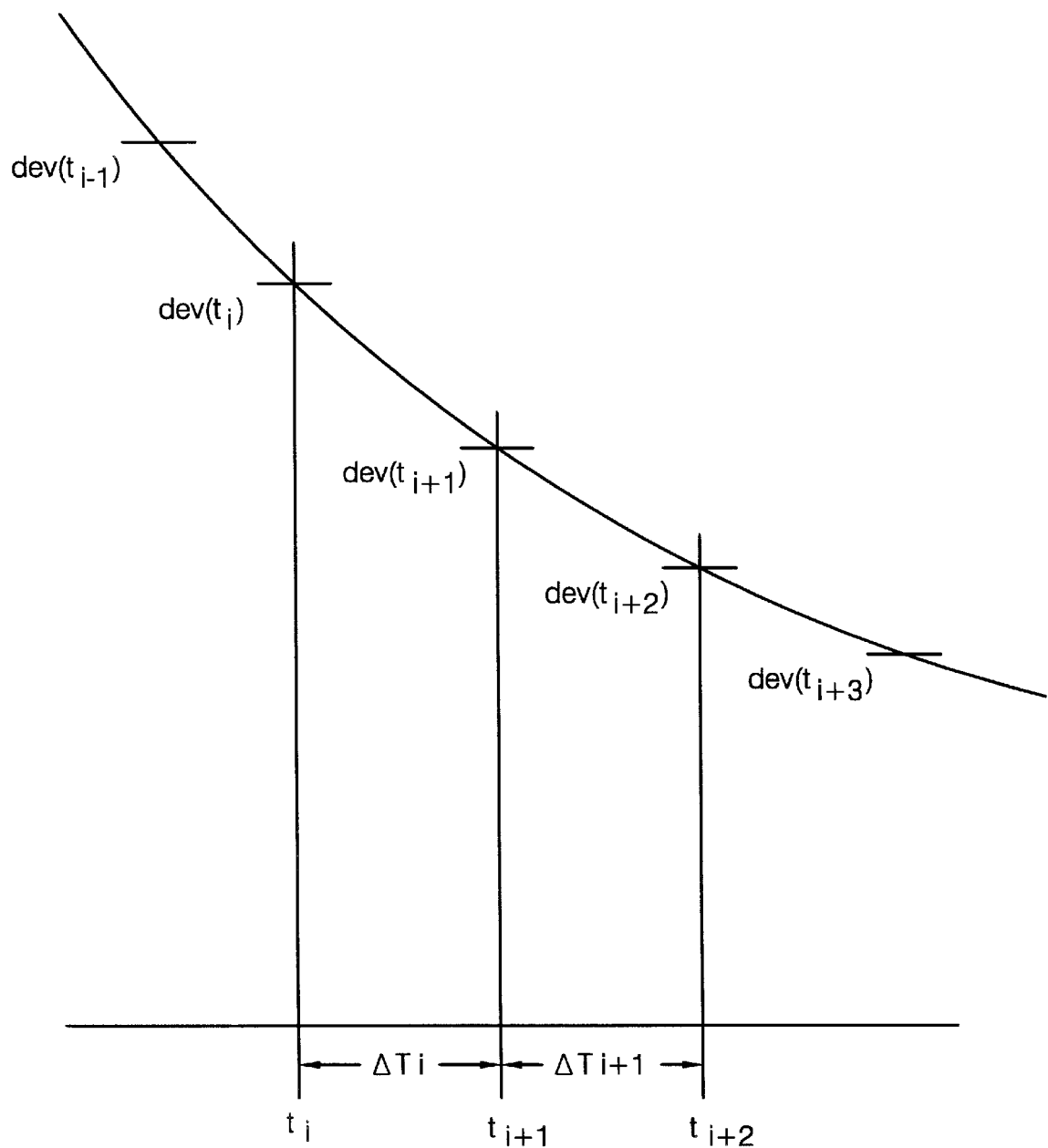
FIG. 2 is a graph detailing the measurement of deviation curvature as utilized in the present invention.

By reference to FIG. 2, it can be seen that measurements are taken at one time, then another time plus one, and then time plus two, time plus three, etc. It must be determined at what time which deviation reaches the level of the decay minus the threshold and where that to decay minus the threshold is constantly present at a measurement of 0.8.

Ratio of two successive time intervals as seen in FIG. 2, is referred to as the deviation curvature. If the curvature is exponential, the deviation curvature is 1. Similarly, if the curve be linear, the deviation curvature is 0.8. By virtue of the above, the prediction of the overshoot can be determined.

When the setpoint is changed, with the fuzzy overshoot suppression in by operation of switch 12A to include fuzzy logic 13, the suppressed setpoint (SSP) will move only 80% of the way toward the new setpoint. The process value then will be controlled to the suppressed setpoint. As the process value approaches the suppressed setpoint, the fuzzy logic must be able to predict whether there will be an overshoot. If there will be no overshoot, the suppression is reduced to zero, otherwise the fuzzy logic keeps the suppression in place longer in order to eliminate or at least reduce the overshoot. This prediction is made on the Lasis of the value of the deviation curvature. It has been determined that as the process value approaches the suppressed setpoint, there is a clear separation between the deviation curvature values of the processes with overshoot and those without.

When a setpoint step is applied, the suppression is initially set to 20% of the step size so the suppressed setpoint moves 80% of the distance to the new setpoint level. By the time the process value has moved approximately three quarters of the way to the suppressed setpoint, the fuzzy logic has determined there will be no overshoot and begins to reduce the suppression. As the fuzzy logic reduces the suppression to zero, the process value approaches the setpoint with typically no change in settling time.

To understand the process where overshoot is present, the suppress setpoint is initially set at 80% of the setpoint and as the process value rises, the fuzzy logic determines that there will be an overshoot and keeps the suppression at the same level. Thus, when process level begins to level off, the fuzzy logic reduces suppression to bring the process value to a "soft landing" at the setpoint level.

Figure 3:
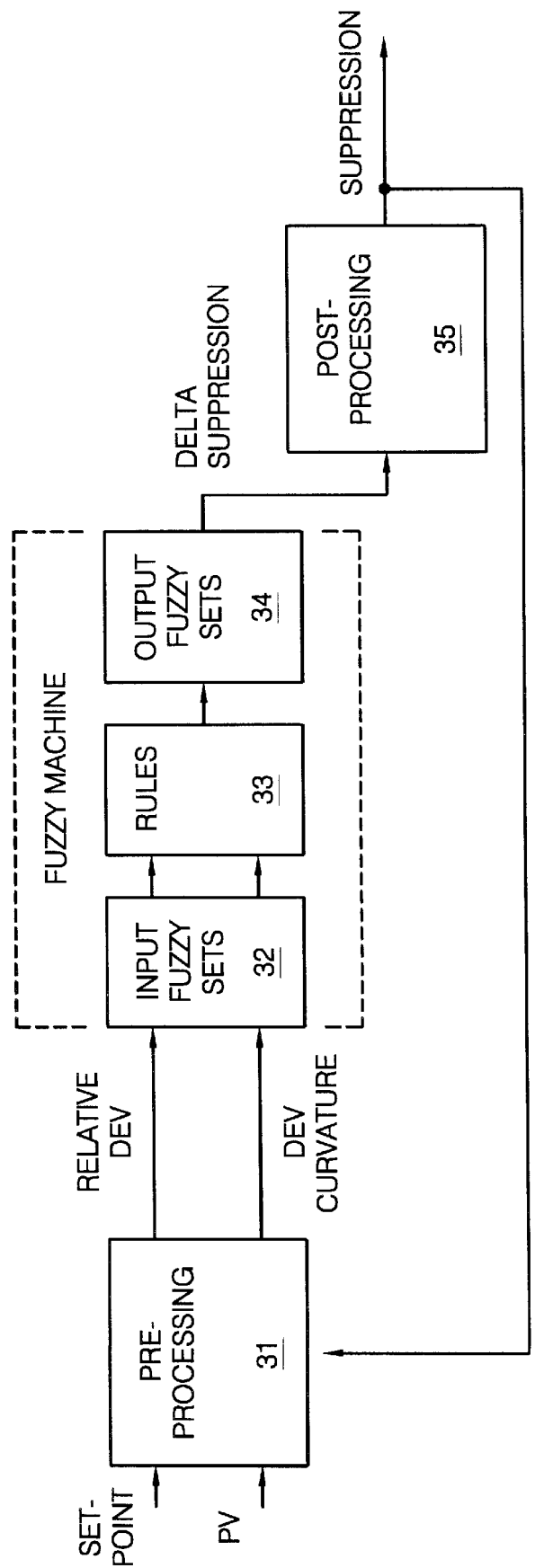
FIG. 3 is a block diagram of the fuzzy logic module as utilized in the method of the present invention.

The operation and circuit details of the fuzzy machine logic module as set forth in FIG. 3 do not form part of the present invention, rather it being only required that those blocks perform as indicated and discussed herein. The particular design details including definition of the fuzzy sets of rules were developed by working in an interactive environment utilizing a closed loop simulation of the system as described hereinafter.

In the post-processing module 35, as shown in FIG. 3, the post-processing module receives a delta suppress value as its input from the fuzzy machine and increases or decreases the value of suppression accordingly. If the delta suppress is positive, the suppression is increased.

Should delta suppression be negative, the suppression is reduced towards zero. The zero rate is scaled using the value of tscale set by preprocessing, so that when the value of delta suppression is decreased, the suppression decays at a rate approximately equal to the process time constant.

Referring again to FIG. 3 where a block diagram of the fuzzy logic module is shown. Overshoot suppression as controlled by the present method is expected to work in a loop with two lags and dead time over a range of process lags of from 10 seconds up to 8 hours with dead time up to a maximum of 15 minutes. It is also expected to work for the setpoint step or a disturbance-induced deviation ranging in amplitude from 1% of range to the entire range.

The fuzzy logic of the present method is expected to reduce overshoot over this range of values with no parameters to be preset as in the prior art and with no pretuning or learning required. The only configuration required is selection of "on" or "off" for fuzzy overshoot suppression as shown in FIG. 1. Any stab)le loop with parameters in the above range which has overshoot will have its overshoot reduced or eliminated by use of the present method. Any loop with no overshoot will continue to have no overshoot and in no case will the overshoot be significantly increased.

The rules embodied in operation of the fuzzy machine of FIG. 3, are shown in TABLE A where information is shown for the deviation curvature wherein the deviation curvature is increasing, fast decay, exponential decay, or slow decay, or suppression at four levels from greater than five times the suppression rate to a zero or negative suppression rate.

The preprocessing module 31 shown in FIG. 3 receives the current value of the setpoint and process value as inputs and provides updated values of relative deviation and deviation curvature to the fuzzy machine which consists of input fuzzy sets 32, rules module 33, and output fuzzy sets 34. The preprocessing module divides the deviation (setpoint minus process value) by the current value of suppression with provision of avoiding a divide by zero error if suppression is zero. It then clamps the result to a value between 0 and 6 and scales the output to the level required by the fuzzy machine. The method for calculation of deviation curvature was outlined previously. This calculation was performed while the deviation was decreasing but behavior must also be defined while the deviation is in any other state, such as increasing, flat or zero.

Figure 4:
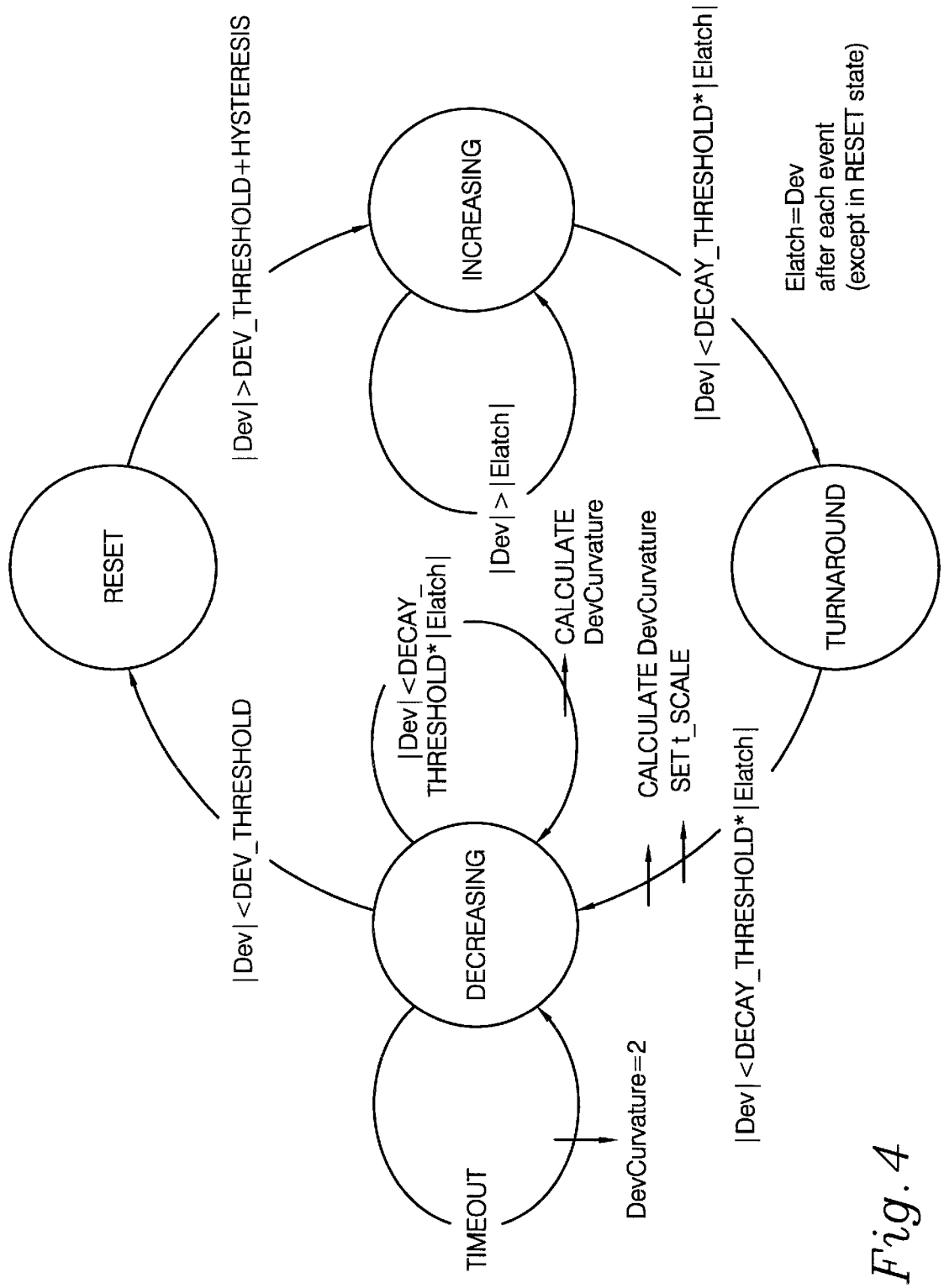
FIG. 4 is a simplified state diagram showering deviation curvature calculation.

In the simplified state diagram shown in FIG. 4, the value of Elatch (decay minus the threshold) is ratcheted up when the deviation is increasing, and then when decreasing it is used as the latch value of deviation as shown in FIG. 4 to calculate the deviation curvature. Note the tscale is set in proportion to the decay rate measured during the turnaround and is used to determine the rate of decay of the suppression.

The details are shown for the various states and events with the resulting action and followed by the resulting state in TABLE B.

While but a single method embodying the present invention has been shown, it will be obvious to those skilled in the art that numerous modifications may be made without departing from the spirit of the present invention, which shall be limited only by the scope of the claims appended hereto.

What is claimed is:

1. In a process control system, the method of suppressing the overshoot of a process variable beyond a predetermined process value setpoint, comprising the steps of:

predicting said overshoot by observing the waveform associated with said process variable;

predicting the overshoot will occur during the rise of the process variable waveform;

the lack of an overshoot process variable approaches the setpoint exponentially;

the presence of an overshoot of the process variable approaches the setpoint linearly;

said observation of said waveform associated with said process variable is made without regard to time scale or, in the alternative, to amplitude scale;

enabling said system to take corrective action to reduce or, in the alternative, to eliminate said overshoot;

utilizing a fuzzy logic module with a proportional integral derivative control to take said corrective action of said process variable.

2. The method as claimed in claim 1 wherein:

said setpoint is initially suppressed.

3. The method as claimed in claim 2 wherein:

the process variable is controlled at said suppressed setpoint by said fuzzy logic.

4. The method as claimed in claim 3 wherein:

when no overshoot exists, said fuzzy logic will reduce said suppressed setpoint to zero.

5. The method as claimed in claim 3 wherein:

should overshoot occur, said fuzzy logic maintains suppression at a level less than said process variable until said process variable levels off after which said fuzzy logic reduces suppression to bring the process variable to the setpoint for the process level.

6. The method as claimed in claim 1 wherein:

determination of the shape of said waveform is made by measuring the time interval over which deviation decays by a fixed proportion.

7. The method as claimed in claim 6 wherein:

the ratio of each pair of successive time values is the exponentiality of said waveform;

said ratio of two successive time intervals makes said deviation curvature.

8. The method as claimed in claim 7 wherein:

said deviation curvature is a measurement as to whether or not an overshoot will exist.

\* \* \* \* \*